United States Patent
Huang et al.

(10) Patent No.: US 10,290,964 B2
(45) Date of Patent: May 14, 2019

(54) ADAPTOR FOR USE IN STORAGE DEVICE

(71) Applicant: EMC IP Holding Company LLC, Hopkinton, MA (US)

(72) Inventors: Angelo Huang, Shanghai (CN); Sandburg Hu, Shanghai (CN); Alice Liu, Shanghai (CN); Lynn Kong, Shanghai (CN); Haifang Zhai, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/712,354

(22) Filed: Sep. 22, 2017

(65) Prior Publication Data

US 2018/0090865 A1 Mar. 29, 2018

(30) Foreign Application Priority Data

Sep. 23, 2016 (CN) .......................... 2016 1 0847734

(51) Int. Cl.
| | |
|---|---|
| H01R 12/73 | (2011.01) |
| H01R 43/20 | (2006.01) |
| G06F 13/38 | (2006.01) |
| H01R 12/70 | (2011.01) |
| H01R 12/72 | (2011.01) |

(52) U.S. Cl.
CPC .......... *H01R 12/732* (2013.01); *G06F 13/38* (2013.01); *H01R 12/7082* (2013.01); *H01R 43/20* (2013.01); *H01R 12/721* (2013.01)

(58) Field of Classification Search
CPC .... H01R 23/70; H01R 23/6813; H01R 12/73; H01R 12/732

USPC .............................................. 439/59, 638, 64
See application file for complete search history.

(56) References Cited

U.S. PATENT DOCUMENTS

| | | | | |
|---|---|---|---|---|
| 4,936,785 A | * | 6/1990 | Krug ...................... | G06F 13/409 439/75 |
| 5,035,631 A | * | 7/1991 | Piorunneck .......... | H01R 23/688 439/108 |
| 5,478,259 A | * | 12/1995 | Noschese ............. | H01R 13/658 439/607.31 |
| 6,935,868 B1 | * | 8/2005 | Campini ................. | G06F 1/186 361/748 |
| 7,281,953 B1 | * | 10/2007 | Jochym ................. | H01R 27/00 361/749 |
| 7,394,652 B1 | * | 7/2008 | Jochym .................. | G06F 1/185 361/679.33 |

(Continued)

*Primary Examiner* — Tulsidas C Patel
*Assistant Examiner* — Peter G Leigh
(74) *Attorney, Agent, or Firm* — Krishnendu Gupta; Lesley Leonessa

(57) ABSTRACT

Embodiments of the present disclosure provide an adapter for use in a storage device. The adapter comprises a substrate including a circuit board and adapted to support a PCIe card in the storage device; a first connector fixed on the substrate and electrically connected with the circuit board, the first connector adapted to connect to the storage device; and an adapting part connected with the substrate and electrically connected with the circuit board, the adapting part including a slot that is adapted to connect to a second connector of the PCIe card. In this manner, additional user-defined IC card functions and advanced features are supported while functions of the existing PCIe cards are fully utilized.

8 Claims, 5 Drawing Sheets

(56) References Cited

U.S. PATENT DOCUMENTS

| | | | | |
|---|---|---|---|---|
| 8,472,204 B2* | 6/2013 | Leibowitz | ............... | G06F 1/186 |
| | | | | 361/736 |
| 9,166,316 B2* | 10/2015 | Chen | ...................... | G11B 25/00 |
| 2006/0221559 A1* | 10/2006 | Campini | .................. | G06F 1/185 |
| | | | | 361/679.36 |
| 2014/0254086 A1* | 9/2014 | Li | .................... | H01R 13/62944 |
| | | | | 361/679.32 |
| 2014/0354124 A1* | 12/2014 | Fehrenbach | ....... | G07D 11/0006 |
| | | | | 312/223.1 |
| 2016/0043484 A1* | 2/2016 | Brodsky | .............. | H01R 12/716 |
| | | | | 439/65 |

\* cited by examiner

ADAPTOR FOR USE IN STORAGE DEVICE

RELATED APPLICATIONS

This application claim priority from Chinese Patent Application Number CN201610847734.2, filed on Sep. 23, 2016 at the State Intellectual Property Office, China, titled "AN ADAPTOR FOR USE IN STORAGE DEVICE" the contents of which is herein incorporated by reference in its entirety.

FIELD

Embodiments of the present disclosure generally relate to the field of storage, and more specifically, to an adapter used in a storage device.

BACKGROUND

Nowadays, the input/output (I/O) card widely applied to the storage device typically has a shape factor of a low-profile-half-length peripheral component interconnect express (PCIe) card, as prescribed by the Peripheral Component Interconnect Special Interest Group (PCI-SIG), and such PCIe card does not support advanced features, such as hot plugging, a stable design and the like, or user-defined functions, despite its known shape, function and wire arrangement.

SUMMARY

A first aspect of the present disclosure provides an adapter for use in a storage device. The adapter comprises a substrate including a circuit board and adapted to support a PCIe card in the storage device; a first connector fixed on the substrate and electrically connected with the circuit board, the first connector being adapted to connect to the storage device; and an adapting part connected with the substrate and electrically connected with the circuit board, the adapting part including a slot that is adapted to connect to a second connector of the PCIe card.

A second aspect of the present disclosure provides an input/output (I/O) card, comprising a PCIe card; and an adapter according to the first aspect of the present disclosure. A third aspect of the present disclosure provides a method of assembling an I/O card, comprising: connecting a second connector of a PCIe card to a slot of the adapter according to the first aspect of the present disclosure; and fixing the PCIe card to the adapter by a mounting hole arranged on a substrate of the adapter and a bolt passing through the PCIe card. A fourth aspect of the present disclosure provides a method of manufacturing the adapter according to the first aspect of the present disclosure.

The adapter according to embodiments of the present disclosure may allow various PCIe card-based standard I/O cards already in use to be conveniently integrated and accommodated therein, thereby forming I/O cards which are adapted to different storage devices and have an interface type and a shape factor different from those of PCIe card. In this way, additional user-defined I/O functions, for example, an independent board power supply switch, monitoring heat dissipation of the I/O card, and advanced features, such as hot plugging and the like, can be supported, while existing PCIe card functions can be fully used. This provides flexibility of a configuration of the I/O card and remarkably reduces the time to market for new products. Further, the related cost for manufacture and development is decreased accordingly.

It will be appreciated that this Summary is not intended to identify key features or essential features of the embodiments of the present disclosure, nor intended to be used to limit the scope of the present disclosure. Other features of the present disclosure will be made apparent by the following description.

BRIEF DESCRIPTION OF THE DRAWINGS

Through description of example embodiments in the drawings, features and advantages of the present disclosure will become apparent. In the drawings.

In all the drawings, identical or similar reference signs represent identical or similar elements.

DETAILED DESCRIPTION OF EMBODIMENTS

Principles of the present disclosure will now be described with reference to some example embodiments. It should be appreciated that description of those embodiments is merely to facilitate those skilled in the art better understanding and further implementing example embodiments disclosed herein and is not intended to limit the scope disclosed herein in any manner. The content of the present disclosure described herein may be implemented in various manners, other than the one described below.

As used herein, the term "include" and its variants are to be read as open-ended terms that mean "include, but is not limited to." The term "based on" is to be read as "based at least in part on." The term "one embodiment" is to be read as "at least one embodiment." The term "another embodiment" is to be read as "at least one another embodiment."

As stated above, in spite of having a certain universal property, most of PCIe card-based I/O cards currently known or already in use are unlikely adapted to particular storage devices including other types of interfaces, nor can it support for example some additional user-defined card functions, as well as some advanced features, such as hot plugging and the like.

Figure 1:
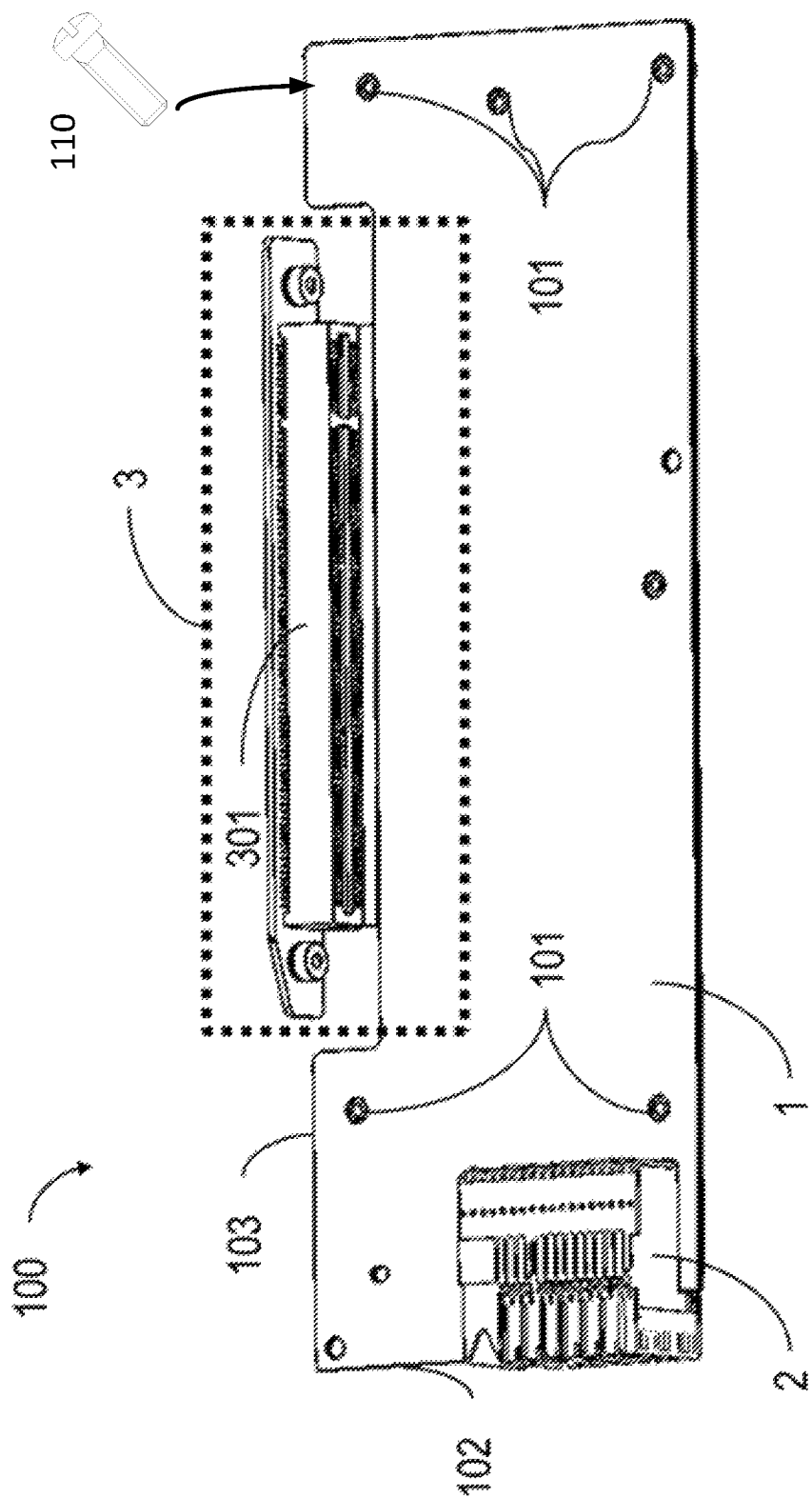
FIG. 1 illustrates a front view stereogram of an adapter according to embodiments of the present disclosure.
Figure 2:
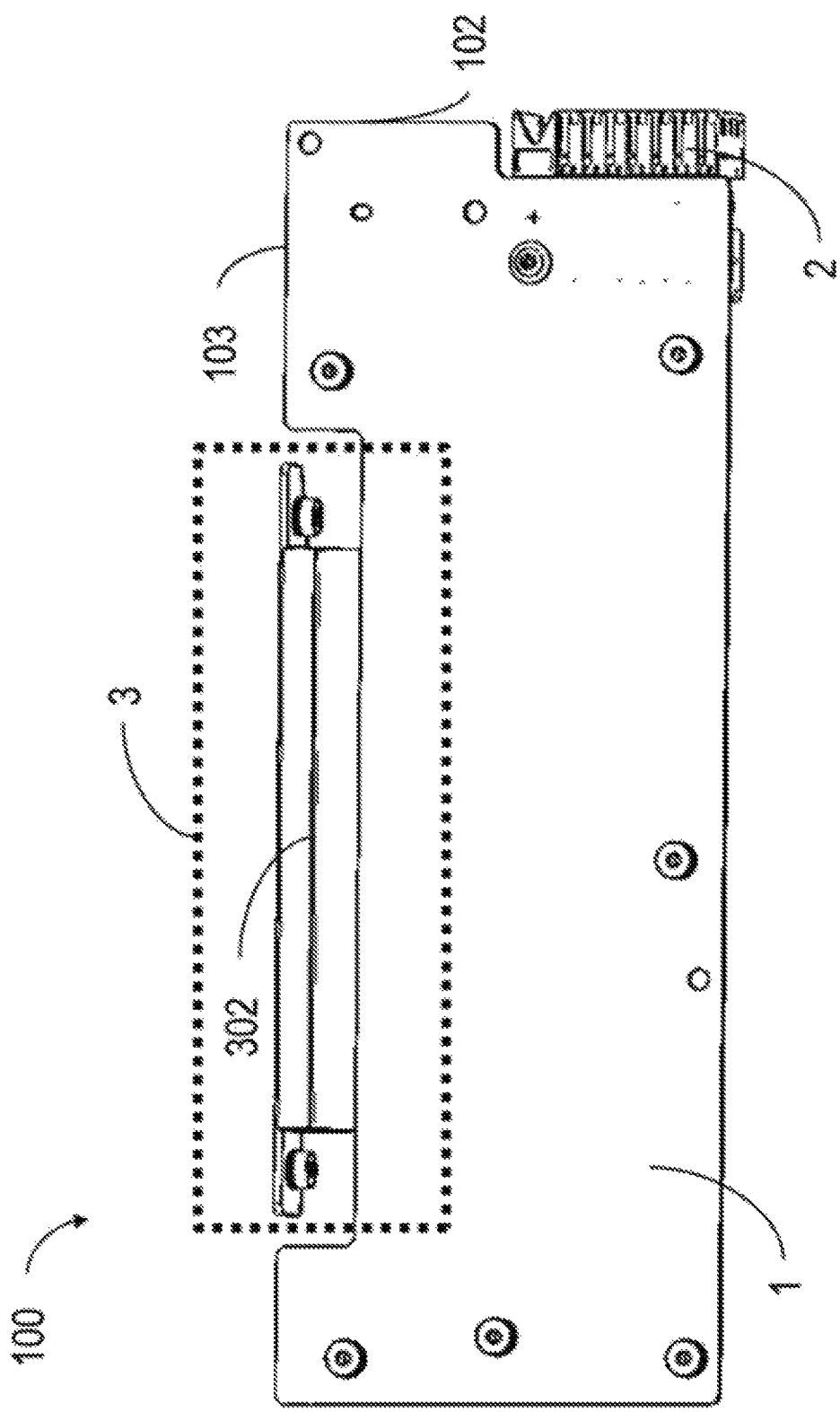
FIG. 2 illustrates a rear view stereogram of an adapter according to embodiments of the present disclosure.
Figure 3:
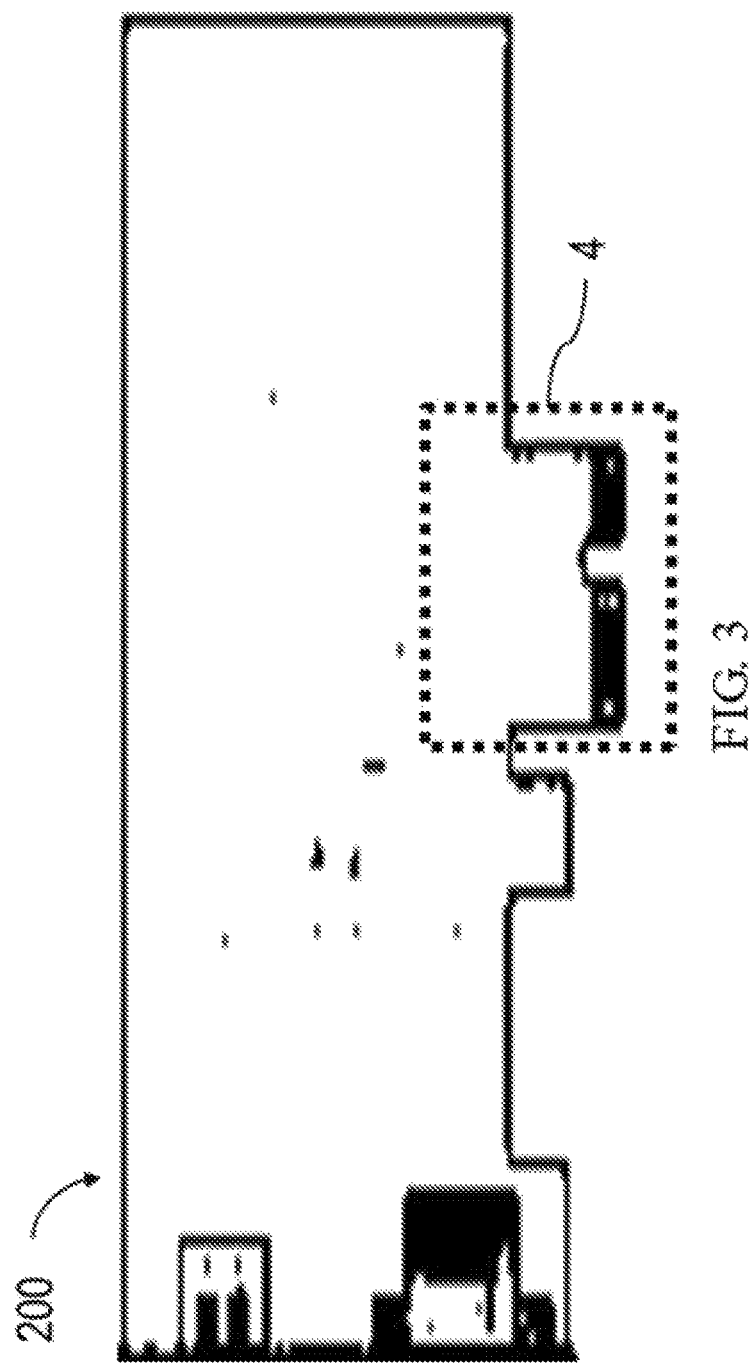
FIG. 3 illustrates a diagram of a PCIe card of an adapter to be installed according to embodiments of the present disclosure.

In order to at least partly overcome the above and other potential defects, embodiments of the present disclosure relate to an adapter 100 for use in a storage device. FIG. 1 and FIG. 2 respectively illustrate a front view stereogram and a rear view stereogram of the adapter 100 according to embodiments of the present disclosure. As shown in FIGS. 1 and 2, the adapter 100 generally includes a substrate 1, a first connector 2 and an adapting part 3. The substrate 1 includes a circuit board (not shown) and is adapted to support a PCIe card 200 in the storage device (which will be shown in FIG. 3). The first connector 2 is fixed onto the substrate 1 and is electrically connected with the circuit board, and the first connector 2 is adapted to connect to the storage device. The adapting part 3 is likewise connected with the substrate 1 and is electrically connected with the circuit board. As shown in FIGS. 1 and 2, the adapting part 3 includes a slot 301 that is adapted to connect to a second connector 4 (which will be shown in detail in FIG. 3) of the PCIe card 200.

Such adapter 100 enables a PCIe card-based standard I/O card to be integrated and accommodated into the adapter card 100 conveniently, so as to form an I/O card which is adapted to different storage devices (e.g. dedicated or particular storage devices) and has a shape factor different from that of the PCIe card (e.g. different from the low-profile-half-length shape factor). In this manner, additional functions, such as integrating an independent board power supply switch on the adapter 100, monitoring heat dissipation of the I/O card and the like, can be achieved according to the user needs, while the existing PCIe card functions are fully utilized.

Moreover, the I/O card can also support advanced features, such as hot plugging and the like, while the PCIe card 200 typically does not have such characteristics. This design enables a flexible configuration of the I/O card and remarkably reduces the time to market for new products. Further, the related cost for production and development is decreased accordingly.

In some embodiments, the circuit board (not shown) included in the substrate 1 may act as an independent component to be detachably mounted onto the substrate 1, may be integrated in certain special regions in the substrate 1, or even itself constitute the entire substrate 1. The circuit board assists in accomplishing some used-defined functions, as mentioned above, and advanced features, such as hot plugging, etc.

In some embodiments, a first connector 2 is inserted and fixed onto the substrate 1 by a metal pin arranged thereon, and is conductively connected with the circuit board via a metal wire in the circuit board. In some embodiments, the first connector 2 has a shape factor different from that of the second connector 4. For example, as shown in FIG. 1, the first connector 2 has a connector (also referred to as an SLIC interface) provided for connecting a storage server and the connector has a shape factor similar to a "cube", and it can be seen, from the slot 301 for receiving the second connector 4 in FIG. 1, that the second connector 4 is a PCIe interface having a relatively flat, elongate shape factor. Since the first connector 2 acting as the SLIC interface has a relatively high signal wire density, more high speed signal wires are arranged within a limited board space to achieve a desired data transmission rate. It will be noted that the SLIC interface is merely illustrative, and the present disclosure is not intended to limit the shape factor of the first connector 2, while the corresponding first connector 2 may be selected based on the storage device, instead.

In some embodiments, the first connector 2 is arranged at a first side 102 of the substrate 1, and the adapting part 3 is arranged at a second side 103 of the substrate 1 where the second side 103 is perpendicular to the first side 102. For example, in FIG. 1, the first side 102 refers to a side defined by a shorter side of the substrate 1, and the side 103 refers to a side defined by a longer side of the substrate 1. It will also be noted that the present disclosure is not intended to limit relative positions of the first connector 2 and the adapting part 3, which may be arranged by a user based on needs.

As shown in FIG. 1, in some embodiments, the adapting part 3 further includes a bending portion 302 electrically connected between the substrate 1 and the slot 301. In some embodiments, the bending portion 302 may be a flexible bending portion. For example, the bending portion 302 may be a flexible connector only including a wire and provided for bendably connecting the slot 301 conductively with the circuit board on the substrate. The bending portion may be a flexible circuit board which include a more complicated circuit function and act as an extended portion of the circuit board in the substrate 1. This type of flexible bending portion 302 is beneficial. For example, referring to FIG. 4, it may enable the PCIe card 200 to be located on the substrate 1 in a substantially parallel or coplanar manner, thereby saving the entire space occupied by the assembled I/O card while ensuring the data communication via the flexible bending portion 302.

Figure 4:
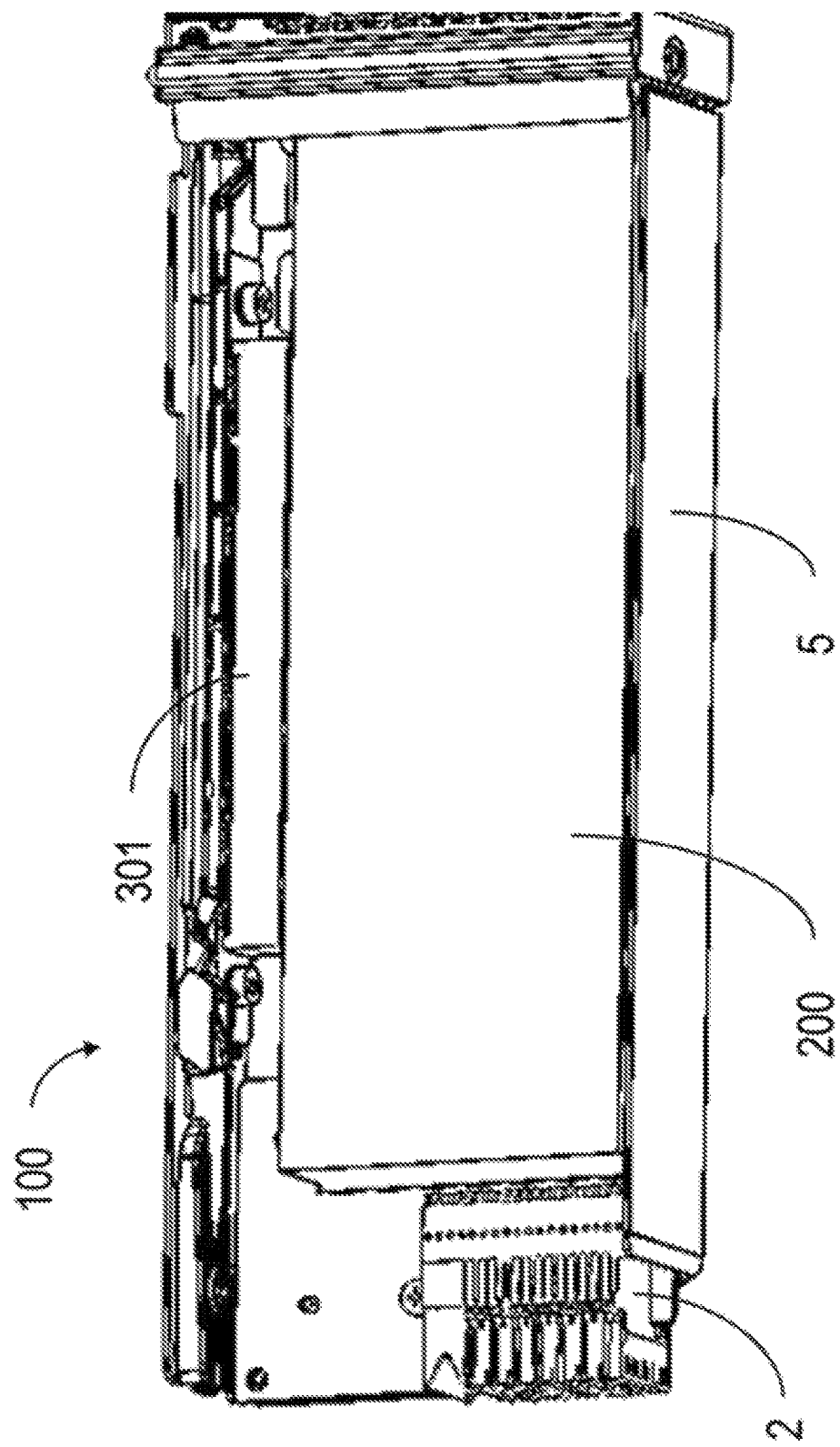
FIG. 4 illustrates a front view stereogram of an I/O card including the adapter, as shown in FIG. 1 or 2, and a PCIe card having been installed onto the adapter.

FIG. 4 illustrates a front view stereogram of the adapter 100, as shown in FIG. 1 or 2, and an I/O card of the PCIe card 200 having been installed onto the adapter 100. As shown in FIG. 4, the adapter 100 further includes a frame 5 which at least partly surrounds a periphery of the substrate 1. The frame 5 defines an outer dimension of the adapter 100, such that the adapter 100 is adapted to a rack of the storage device. In addition to this, the frame 5 is advantageous for guiding a movement of the adapter 100 when the adapter 100 is inserted into the rack of the storage device.

Returning to FIG. 1, the adapter 100 further includes at least one mounting hole 101 arranged on the substrate 1, and the mounting hole 101 cooperates with a bolt 110 passing through the PCIe card 200 to fix the PCIe card 200 to the adapter 100. According to embodiments of the present disclosure, at least one mounting hole 101 includes at least two symmetrically arranged mounting holes 101, which facilitating fixing the PCIe card 200 onto the substrate 1 balanced and stably. It would be appreciated that, besides the bolt 110 or as a supplement, any appropriate mechanism may be used to fix the PCIe card 200 to the adapter 100.

Figure 5:
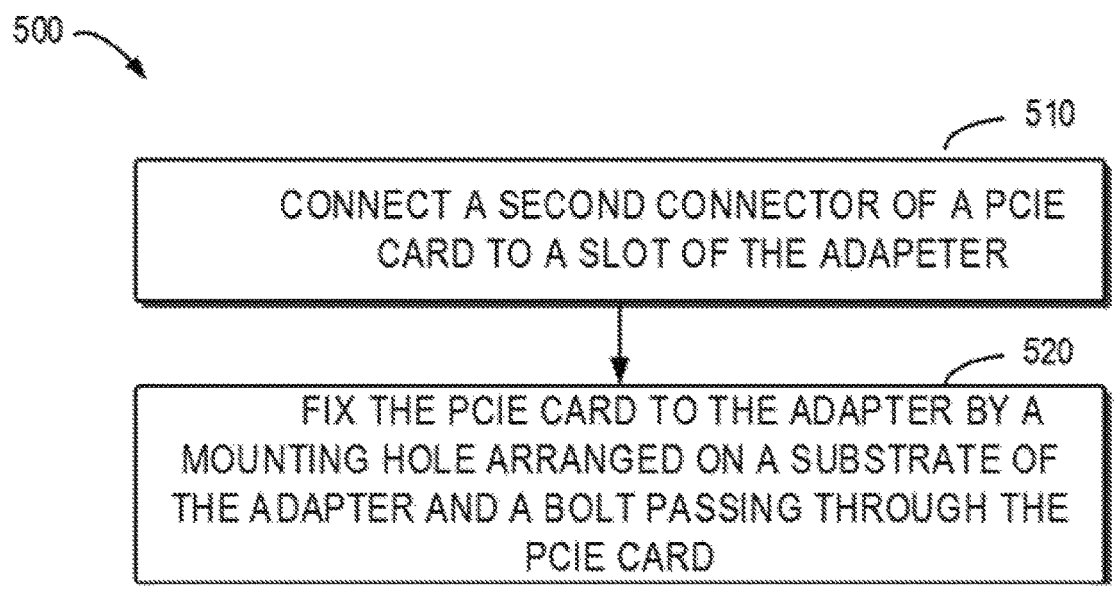
FIG. 5 illustrates a flow chart of a method of assembling an I/O card according to embodiments of the present disclosure.

FIG. 5 illustrates a flow chart of method 500 of installing an I/O card according to embodiments of the present disclosure. Referring to FIGS. 1-4, the method 500 includes: at 510, connecting the second connector 4 of the PCIe card 200 to the slot 301 of the adapter 100. At 520, the PCIe card 200 is fixed to the adapter 100 in a manner of bolt 110 connection by the mounting hole 101 arranged on the substrate 1 of the adapter 100 and the bolt 110 passing through the PCIe card 200. It will be noted that, at 510, the PCIe card 200 can still be oriented via the flexible bending portion 302 at any angle relative to the substrate 1 after being connected with the slot 302. After the PCIe card 200 is subsequently located onto the substrate 1 in a manner of being substantially coplanar with the substrate 1, fixing with the substrate 1 is finally accomplished in 520. This simplifies the installation of the I/O card.

In general, though details of several embodiments are included in the above discussion, they shall not be construed as limiting the scope of the present disclosure in any manner, and the description of features is only provided for the specific embodiments. Certain features, as described in some separate embodiments, may be implemented in combination in an embodiment. In turn, various features, as described in an embodiment, may be implemented in multiple embodiments separately or in any appropriate sub-combination.

Although the present disclosure is not described with specific structural features, it would be appreciated that the scope of the technical solution defined in the appended claims is not necessarily confined to the foregoing specific features. In other words, above described are only optional embodiments of the present disclosure. For those skilled in the art, the embodiments of the present disclosure may allow various modifications and changes. Any modification, equivalent replacement, improvement, etc., falling within the spirits and principles of the present disclosure, is covered in the protection scope of the present disclosure.

What is claimed is:

1. An adapter (100) for use in a storage device, comprising:
   a substrate (1) including a circuit board and adapted to support a PCIe card in the storage device;
   a first connector (2) fixed on the substrate (1) and electrically connected with the circuit board, the first connector (2) being adapted to connect to the storage device;
   an adapting part (3) connected with the substrate (1) and electrically connected with the circuit board, the adapting part (3) including a slot (301) that is adapted to connect to a second connector (4) of the PCIe card (200); and
   a mounting hole (101) arranged on the substrate (1), the mounting hole (101) being adapted to match with a bolt (110) passing through the PCIe card (200), and to fix the PCIe card (200) to the adapter (100).

2. The adapter (100) according to claim 1, wherein the first connector (2) has a shape factor different from that of the second connector (4).

3. The adapter (100) according to claim 1, wherein the adapting part (3) further comprises:
   a bending portion (302) conductively coupled between the substrate (1) and the slot (301).

4. The adapter (100) according to claim 3, wherein the bending portion (302) is adapted to be a flexible bending portion.

5. The adapter (100) according to claim 1, wherein
   the first connector (2) is arranged at a first side (102) of the substrate (1), and
   the adapting part (3) is arranged at a second side (103) of the substrate (1), the second side (103) being perpendicular to the first side (102).

6. The adapter (100) according to claim 1, further comprising:
   a frame (5) at least partially surrounding a periphery of the substrate (1), the frame (5) defining an outer dimension of the adapter (100) and adapted to fit the adapter (100) to a rack of the storage device.

7. An input/output (I/O) card, comprising:
   a PCIe card (200); and
   an adapter (100), comprising:
      a substrate (1) including a circuit board and adapted to support a PCIe card in the storage device;
      a first connector (2) fixed on the substrate (1) and electrically connected with the circuit board, the first connector (2) being adapted to connect to the storage device;
      an adapting part (3) connected with the substrate (1) and electrically connected with the circuit board, the adapting part (3) including a slot (301) that is adapted to connect to a second connector (4) of the PCIe card (200); and
      a mounting hole (101) arranged on the substrate (1), the mounting hole (101) being adapted to match with a bolt (110) passing through the PCIe card (200), and to fix the PCIe card (200) to the adapter (100).

8. A method of assembling an input/output (I/O) card, comprising:
   connecting a second connector (4) of a PCIe card (200) to a slot (301) of the adapter (100)), comprising:
      a substrate (1) including a circuit board and adapted to support a PCIe card in the storage device;
      a first connector (2) fixed on the substrate (1) and electrically connected with the circuit board, the first connector (2) being adapted to connect to the storage device;
      an adapting part (3) connected with the substrate (1) and electrically connected with the circuit board, the adapting part (3) including a slot (301) that is adapted to connect to a second connector (4) of the PCIe card (200); and
   a mounting hole (101) arranged on the substrate (1), the mounting hole (101) being adapted to match with a bolt (110) passing through the PCIe card (200), and to fix the PCIe card (200) to the adapter (100); and
   fixing the PCIe card (200) to the adapter (100) by a mounting hole (101) arranged on a substrate of the adapter (100) and a bolt passing through the PCIe card (200).

* * * * *